(12) United States Patent
Watanabe

(10) Patent No.: US 7,356,212 B2
(45) Date of Patent: Apr. 8, 2008

(54) OPTICAL WAVEGUIDE DEVICE AND METHOD OF ADJUSTING A TRANSMISSION LOSS THEREOF

(75) Inventor: Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/581,327

(22) Filed: Oct. 17, 2006

(65) Prior Publication Data

US 2007/0104422 A1    May 10, 2007

(30) Foreign Application Priority Data

Oct. 24, 2005    (JP) .............. 2005-308685

(51) Int. Cl.
*G02B 6/12* (2006.01)
(52) U.S. Cl. .......... 385/14; 385/43; 385/129; 385/130; 385/132; 385/140
(58) Field of Classification Search .......... 385/37, 385/24, 42, 41, 43, 45, 46, 14, 48, 47, 49, 385/140, 129, 130, 131, 132, 141
See application file for complete search history.

(56) References Cited

U.S. PATENT DOCUMENTS

| | | | |
|---|---|---|---|
| 6,879,748 B2 * | 4/2005 | Kaneko ............ | 385/24 |
| 6,947,633 B2 * | 9/2005 | Singh et al. ........ | 385/27 |
| 7,103,247 B2 * | 9/2006 | Yamazaki et al. .... | 385/39 |
| 7,151,873 B2 * | 12/2006 | Yamazaki et al. .... | 385/39 |
| 2003/0086651 A1 | 5/2003 | Chang et al. ....... | 385/48 |
| 2007/0071388 A1 * | 3/2007 | Lu ................. | 385/37 |

FOREIGN PATENT DOCUMENTS

| | | |
|---|---|---|
| CN | 1305598 A | 7/2001 |
| EP | 1 033 593 A1 | 9/2000 |
| JP | 2000-221350 A | 8/2000 |
| JP | 2002-518702 A | 6/2002 |

OTHER PUBLICATIONS

Kamei S et al: "6464-channel uniform-loss and cyclic-frequency arrayed-waveguide grating router module" Electronics Letters, IEE Stevenage, GB, vol. 39, No. 1, Jan. 9, 2003, pp. 83-84, XP006019517.

* cited by examiner

*Primary Examiner*—Brian M. Healy
(74) *Attorney, Agent, or Firm*—Sughrue Mion, PLLC

(57) ABSTRACT

An optical waveguide device includes a plurality of optical waveguides propagating therethrough a signal beam, and a plurality of optical sub-waveguides connected to the plurality of optical waveguides respectively, applying an excessive loss to the signal beam by branching a partial beam of the signal beam. A dynamic range and a tolerance in an amount of the excessive loss is adjusted by adjusting widths of the plurality of optical sub-waveguides with respect to the plurality of optical waveguides, and the amount of the excessive loss applied to the signal beam are adjusted by adjusting an angle connecting each of the plurality of optical sub-waveguides with respect to each of the plurality of optical waveguides.

36 Claims, 11 Drawing Sheets

WAVELENGTH

OPTICAL WAVEGUIDE DEVICE AND METHOD OF ADJUSTING A TRANSMISSION LOSS THEREOF

BACKGROUND OF THE INVENTION

1. Field of the Invention

The present invention relates to an optical waveguide device used in optical communications and the like, and to a method of adjusting a transmission loss of the optical waveguide device. To be more specific, the present invention relates to the optical waveguide device equipped with a plurality of optical waveguides such as arrayed waveguide gratings, optical splitters, and optical star couplers, and also relates to the method of adjusting the transmission loss of the optical waveguide device.

2. Description of the Related Art

In wavelength division multiplexing (WDM) transmission systems, arrayed waveguide gratings are generally used as either optical demultiplexers or optical multiplexers. It should be noted that an arrayed waveguide grating will be abbreviated as an "AWG" hereinafter. A basic structure of an AWG is described in, for example, a related art document 1, namely, Japanese Patent Application Laid-open No. 2000-221350 (refer to FIG. 10). FIG. 8 is a plan view for showing a basic structure of a general-purpose AWG. A description is made of the basic structure of the AWG based upon this drawing. The AWG 100 is constructed in such a manner that an input waveguide 101, "n" (symbol "n" is an integer equal to or larger than 2) output waveguides 102-1 to 102-n, a plurality of arrayed waveguides 103, a slab waveguide 104, and another slab waveguide 105 are formed on a substrate 106. The slab waveguide 104 connects the input waveguide 101 to the arrayed waveguides 103. The slab waveguide 105 connects the arrayed waveguides 103 to the output waveguides 102-1 to 102-n.

Next, operations of the AWG 100 will now be explained. The AWG 100 functions as an optical demultiplexer. First, a wavelength division multiplexing (WDM) signal beam "LO" (having wavelength of $\lambda 1, \lambda 2, \lambda 3, \ldots, \lambda n$) is inputted via the input waveguide 101 to the AWG 100. Accordingly, the WDM signal beam LO is diffracted within the slab waveguide 104 to be widened, and then, the widened WDM signal beams LO are outputted to the respective arrayed waveguides 103. Lengths of adjoining waveguides of these arrayed waveguides 103 are different from each other. As a result, the respective WDM signal beams propagated through the arrayed waveguides 103 produce phase differences at the respective output terminals of the arrayed waveguides 103. As a consequence, the WDM signal beams outputted to the slab waveguide 105 may induce multiple beam interference in this slab waveguide 105. Then, signal beams having the same wavelengths are condensed to the respective input terminals of the output waveguides 102-1 to 102-n, and the condensed signal beams are outputted to the respective output waveguides 102-1 to 102-n. As a result, signal beams L1, L2, L3, ..., Ln having wavelengths $\lambda 1$, $\lambda 2, \lambda 3, \ldots, \lambda n$ respectively, which are different from each other, are individually outputted from the respective output waveguides 102-1 to 102-n.

It should be noted that since the output waveguides 102-1 to 102-n are employed as waveguides for inputting and the input waveguide 101 is employed as an waveguide for outputting, the AWG 100 may be also operated as an optical multiplexer. Accordingly, the signal beams L1, L2, L3, ..., Ln having the respective wavelengths are inputted to the output waveguides 102-1 to 102-n respectively, so the WDM signal beam "LO" is outputted from the input waveguide 101.

However, the AWG 100 has a wavelength dependence. To be specific, intensity of the signal beams L1 ($\lambda 1$), L2 ($\lambda 2$), L3 ($\lambda 3$), ..., Ln ($\lambda n$) outputted from the AWG 100 is not equal to each other. FIG. 9 is a graph for representing transmission losses with respect to each of ports (i.e., respective wavelengths) that a general-purpose AWG has. It should be noted that a transmission loss is assumed as a loss of optical power, which is produced when a signal beam passes through an optical component. As previously explained, the transmission losses are different from each other for every wavelength to be outputted. This is because light propagated through a slab waveguide has an intensity distribution, so there is such a trend that the intensity of the light propagated closer to the vicinity of a center of the output waveguides becomes stronger, whereas the intensity of the light propagated closer to a peripheral portion of the output waveguides becomes weaker. As a consequence, there is a trend that the transmission loss of the wavelengths closer to the vicinity of the center of the output waveguides is smaller, whereas the transmission loss of the wavelengths closer to the edge thereof is larger. On the other hand, in a WDM transmission system, such a condition that intensity of signal beams having respective wavelengths is equal to each other is desirable in order to maintain a transmission quality. As a consequence, in order to compensate fluctuations in the transmission losses, optical attenuators and the like must be mounted on the respective ports of the AWG, and thus, transmission losses of the respective ports must be equalized with each other. This has been a cause of making the entire module bulky, requiring high cost.

Under such the circumstance, ideas for solving the above-explained problems have been proposed in the related art publication 1 (refer to FIG. 8). FIG. 10 is a plan view for showing an optical waveguide structure applied to an optical waveguide device disclosed in the related art publication 1. The optical waveguide structure 110 is provided on the output waveguides 102-1 to 102-n of the AWG 100. The optical waveguide structure 110 is constructed of an output waveguide 102-m through which a signal beam "Lm" passes, and a cross waveguide 112-m which crosses with the output waveguide 102-m. It should be noted that symbol "m" indicates any integer which satisfies $1 \leq m \leq n$. The cross waveguide 112-m crosses with the output waveguide 102-m at a cross portion 113-m. As a result, the cross waveguide 112-m gives an excessive loss to the signal beam Lm. The optical waveguide structure 110 controls the transmission losses by controlling a cross angle "a2" of the cross portion 113-m.

However, the optical waveguide structure 110 has the below-mentioned problem. That is, it is difficult to obtain a desirable excessive loss amount by merely adjusting the cross angle "a2." This is because there are possibilities that a tolerance for adjusting the excessive loss amount becomes excessively severe, and such a dynamic range having a sufficient excessive loss amount cannot be achieved. As a result, the difference in the transmission losses among the output waveguides cannot be sufficiently reduced. As previously explained, the previous proposals have such a problem that it is difficult to control the difference in the transmission losses among the plurality of optical waveguides in high precision.

SUMMARY OF THE INVENTION

In view of the foregoing and other exemplary problems, drawbacks, and disadvantages of the related art methods and structures, an exemplary feature of the present invention is to provide an optical waveguide device for more precisely controlling a difference in transmission loss occurring in signal beams which are propagated through a plurality of optical waveguides, and a method of adjusting the transmission loss of the optical waveguide device.

An optical waveguide device according to the present invention includes a plurality of optical waveguides propagating therethrough a signal beam, and a plurality of optical sub-waveguides connected to the plurality of optical waveguides respectively, applying an excessive loss to the signal beam by branching a partial beam of the signal beam. A dynamic range and a tolerance in an amount of the excessive loss is adjusted by adjusting widths of the plurality of optical sub-waveguides with respect to the plurality of optical waveguides, and the amount of the excessive loss applied to the signal beam are adjusted by adjusting an angle connecting each of the plurality of optical sub-waveguides with respect to each of the plurality of optical waveguides.

A method of adjusting a transmission loss in an optical waveguide, according to the present invention, includes (a) propagating a signal beam by each of a plurality of optical waveguides, (b) branching a partial beam of the signal beam by a plurality of optical sub-waveguides connected to the plurality of optical waveguides to apply an excessive loss to the signal beam, (c) adjusting widths of the plurality of optical sub-waveguides with respect to the plurality of optical waveguides to adjust a dynamic range and a tolerance in an amount of the excessive loss, (d) adjusting a connection angle of each of the plurality of optical sub-waveguides with respect to each of the plurality of optical waveguides to adjust the excessive loss amount applied to the signal beams, and (e) controlling a difference in the transmission losses in the plurality of signal beams.

The optical waveguide device and the method of adjusting the transmission loss thereof according to the present invention allow the excessive losses to be applied to the respective signal beams which are propagated through the plurality of optical waveguides with the above-mentioned structure and by the above-mentioned method. Therefore, the present invention has such an effect that both a desirable dynamic range and a desirable tolerance can be achieved in the excessive loss amount. As a consequence, according to the present invention, there is such an effect that the difference in the transmission losses of the signal beams propagated through the plurality of optical waveguides can be controlled with higher precision.

BRIEF DESCRIPTION OF THE DRAWINGS

The exemplary aspects, features and advantages of the present invention will become more apparent from the following detailed description when taken in conjunction with the accompanying drawings wherein.

DETAILED DESCRIPTION OF THE PREFERRED EMBODIMENTS

Figure 1A:
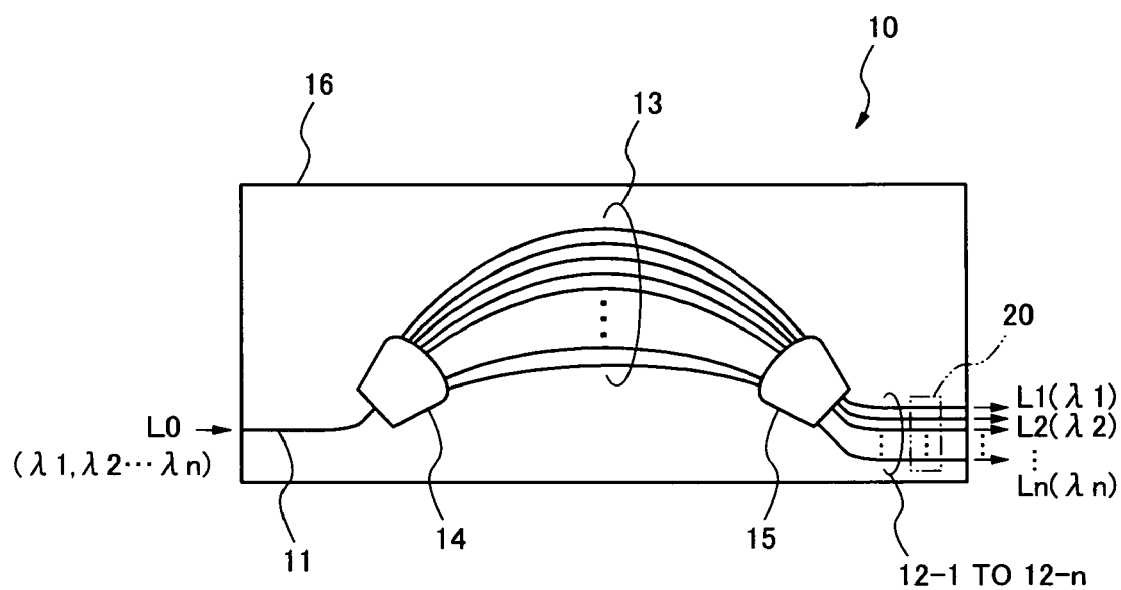
FIG. 1A is a plan view for showing an arrayed waveguide grating (AWG) equipped with an optical waveguide circuit according to a first embodiment of the present invention.

Exemplary aspects for carrying out the present invention will be described in detail below with reference to the drawing. The exemplary aspects described below show only illustrative examples in understanding the present invention, and the claims of the invention are not limited to these exemplary aspects. It should be noted that as a concrete example of an optical sub-waveguide, in an embodiment, the optical sub-waveguide is indicated by a cross waveguide and a branching waveguide. The optical sub-waveguide causes a signal beam which is propagated through each of a plurality of optical waveguides to branch to a partial beam, and applies an excessive loss to the signal beam.

Now, a detailed description is made of an optical waveguide device and a method for adjusting a transmission loss of the optical waveguide device according to a first embodiment of the present invention.

Figure 1C:
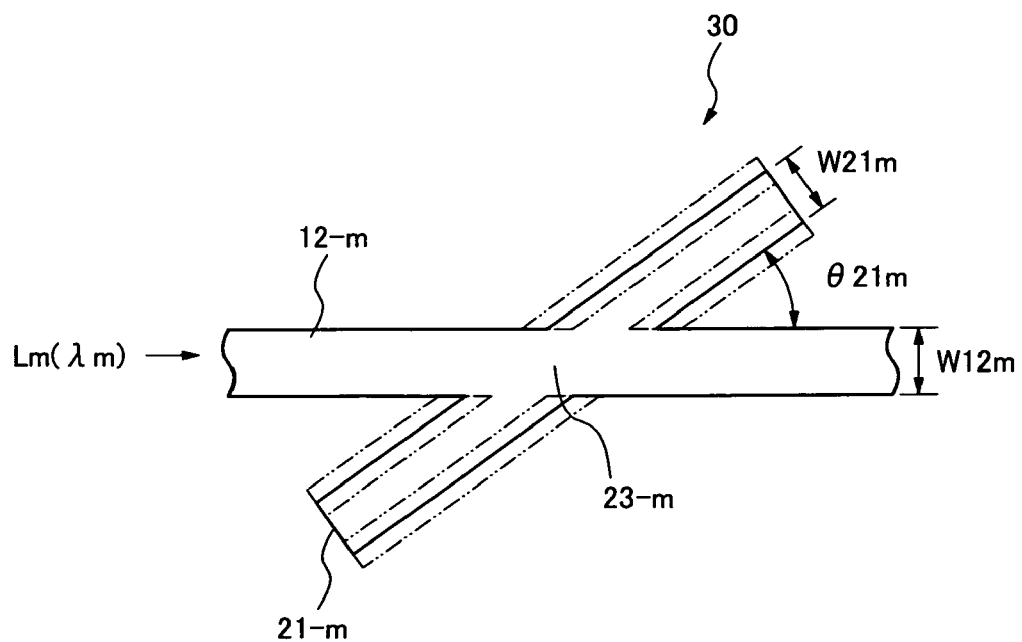
FIG. 1C is a partially enlarged view for showing an optical waveguide of the optical waveguide circuit in FIG. 1B.
Figure 1B:
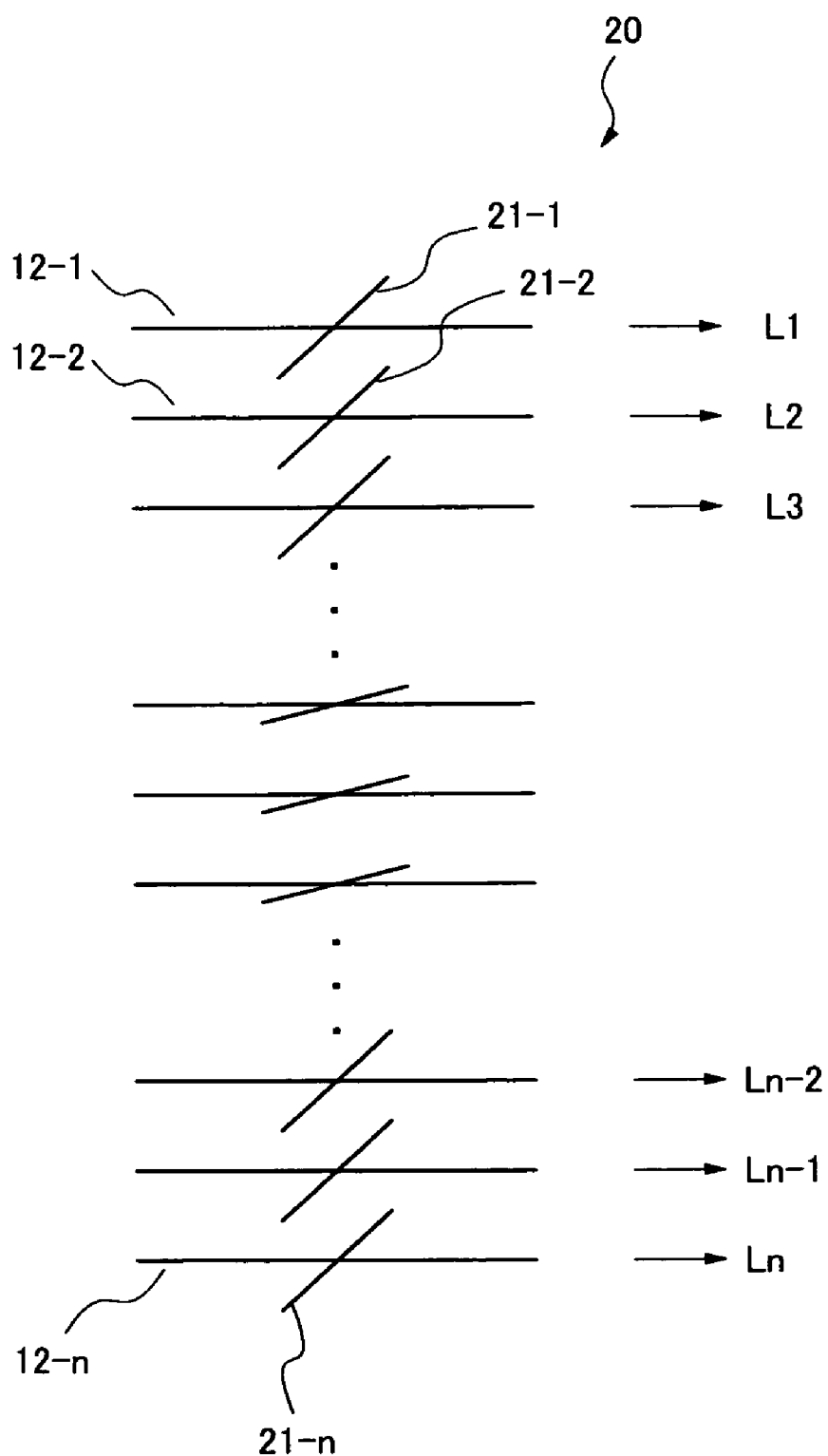
FIG. 1B is a plan view for showing the optical waveguide circuit in FIG. 1A.

FIG. 1A is a plan view for indicating an arrayed waveguide grating (AWG) 10 equipped with an optical waveguide circuit according to the first embodiment of the present invention. FIG. 1B is a plan view for representing the optical waveguide circuit in FIG. 1A. FIG. 1C is a partially enlarged view for showing an optical waveguide of the optical waveguide circuit in FIG. 1B. Based upon these drawings, the first embodiment will now be explained.

As represented in FIG. 1A, an AWG 10 includes one input waveguide 11, "n" (symbol "n" is an integer equal to or larger than 2) output waveguides 12-1 to 12-n, a plurality of arrayed waveguides 13, a slab waveguide 14, another slab waveguide 15, and an optical waveguide circuit 20 on a substrate 16. The slab waveguide 14 connects the input waveguide 11 to the arrayed waveguides 13. The slab waveguide 15 connects the arrayed waveguides 13 to the output waveguides 12-1 to 12-n. Then, optical waveguide circuit 20 is formed on intermediate portions of the output waveguides 12-1 to 12-n. The optical waveguide circuit 20 has a function capable of solving a fundamental transmission loss difference among the output waveguides 12-1 to 12-n. It should be noted that the one input waveguide 11 may be alternatively selected from a plurality of input waveguides 11 that are previously set on the substrate 16 to be used.

As indicated in FIG. 1B, the optical waveguide circuit 20 includes cross waveguides 21-1 to 21-n which cross with the output waveguides 12-1 to 12-n respectively. Cross angles of the respective cross waveguides 21-1 to 21-n have been adjusted with respect to the output waveguides 12-1 to 12-n respectively.

Next, with reference to FIG. 1C, the cross waveguides will be explained in detail. That is, an output waveguide "12-m" (symbol "m" shows an arbitrary integer among 1 to n) propagates therethrough a signal beam "Lm." A cross waveguide "21-m" crosses with the output waveguide 12-m so as to apply an excessive loss to the signal beam Lm. A cross angle "θ21m" of the cross waveguide 21-m has been individually adjusted to be fitted to the output waveguide 12-m. Also, a width "W21m" of the cross waveguide 21-m is predetermined with respect to the width W12m of the output waveguide 12-m. It should be noted that widths W211 to W21n of the cross waveguides 21-1 to 21-n may be alternatively and individually adjusted in a similar manner to the cross angles.

Next, a description is made of a method for manufacturing the AWG 10. The AWG 10 can be manufactured by employing a general optical waveguide manufacturing method. First, silica-based glass called a "lower clad" is deposited on a substrate made of silicon or the like. Silica-based glass having a high refractive index, which is called a "core", is deposited on the resulting substrate. Then, a core pattern is formed by way of a photolithographic technique. Further, silica-based glass is deposited on the deposited core pattern, while this silica-based glass has a refractive index substantially equal to that of the lower clad and is referred to as an "upper clad." Finally, since the patterned core is embedded, an optical waveguide is manufactured. It should be noted that the optical waveguides provided in the optical waveguide circuit 20 are manufactured by performing the above-explained general optical waveguide manufacturing method, and no additional process operation is required.

Next, operations of the AWG 10 will be described. The AWG 10 functions as an optical demultiplexer. First, a wavelength division multiplexing (WDM) signal beam LO (having $\lambda 1, \lambda 2, \lambda 3, \ldots, \lambda n$) is inputted to the AWG 10 through the input waveguide 11. Then, this WDM signal beam LO is diffracted to be widened within the slab waveguide 14, and the widened WDM signal beams LO are outputted to the respective arrayed waveguides 13. The adjoining arrayed waveguides 13 have constant optical path length differences (ΔL) respectively, and optical path lengths thereof are slightly different from each other. As a result, the respective WDM signal beams propagated through the arrayed waveguides 13 produce phase differences at the respective output terminals of the arrayed waveguides 13. Accordingly, the WDM signal beams outputted to the slab waveguide 15 induce multiple beam interference in this slab waveguide 15. Next, such signal beams having the same signal wavelengths are condensed at the respective input terminals of the output waveguides 12-1 to 12-n. Then, the signal beams having the same signal wavelengths are outputted to the plurality of output waveguides 12-1 to 12-n, which are arranged at focal positions of the respective wavelengths. In this case, the AWG 10 has the optical waveguide circuit 20 at the intermediate portions of the output waveguides 12-1 to 12-n. As indicated in FIG. 1B and FIG. 1C, in the optical waveguide circuit 20, the cross waveguides 21-1 to 21-n cross with the output waveguides 12-1 to 12-n respectively. As a result, as an example, an excessive loss is applied to the signal beam Lm propagated through the output waveguide 12-m. This reason is given as follows. That is, the signal beam Lm propagated through the output waveguide 12-m is diffracted in a cross portion 23-m, or a partial beam of the signal beam is coupled to the cross waveguide 21-m. Therefore, since the cross angle of the cross waveguide 21-m with respect to the output waveguide 12-m is controlled, the transmission loss can be controlled. As previously explained, the predetermined excessive losses are applied to the signal beams L1 to Ln having the respective wavelengths by the respective cross waveguides 21-1 to 21-n which are provided in the respective output waveguides 12-1 to 12-n. As a result, the signal beams L1, L2, L3, . . . , Ln having the respective wavelengths $\lambda 1, \lambda 2, \lambda 3, \ldots, \lambda n$ are outputted from the respective output waveguides 12-1 to 12-n respectively, while the transmission losses of these signal beams L1, L2, L3, . . . , Ln are adjusted. As explained above, the WDM signal beams whose plurality of wavelengths have been multiplexed are demultiplexed by this AWG 10 so as to obtain the signal beams L1 through Ln having the respective wavelengths in a batch manner.

An excessive loss amount may be adjusted by a cross angle "θ21m" with respect to the output waveguide 12-m of each of the cross waveguides 21-m. If the cross angle θ21m is made acute (i.e., approximated to 0 degree), then an amount of a signal beam which is coupled from the output waveguide 12-m to the cross waveguide 21-m is increased. As a result, the excessive loss amount is increased. Accordingly, the excessive loss amounts applied to the respective output waveguides 12-1 to 12-n can be adjusted by the cross angle θ21m.

It should be noted that the excessive loss amounts applied by the optical waveguide circuit 20 have been set in such a manner that the excessive loss amounts given to the output waveguides 12-m provided on the center side of the array become larger, whereas the excessive loss amounts given to the output waveguides 12-m provided on the edge side of the array become smaller. Concretely speaking, the cross angles θ211 to θ21n of the cross waveguides 21-1 to 21-n provided on the center side of the output waveguides 12-1 to 12-n become acute angles, whereas those ones provided on the edge side of the output waveguides 12-1 to 12-2 become obtuse angles. As a result, although the AWG 10 has such a transmission loss characteristic that, in principle, transmission losses of channels located on the center side become smaller whereas transmission losses of channels located on the edge side become larger, this transmission loss characteristic may be compensated by the optical waveguide circuit 20. As a consequence, the transmission loss amounts among the channels may be equalized.

Also, the AWG 10 may function as an optical multiplexer. The signal beams L1 to Ln having the respective wavelengths pass through the output waveguides 12-1 to 12-n corresponding thereto, and then, are inputted to the AWG 10. Then, in accordance with operations which are performed in an opposite sense to the above-explained operations, the signal beams L1 to Ln are multiplexed by the AWG 10, so that the multiplexed WDM signal beam LO is outputted from the input waveguide 11.

Figure 2:
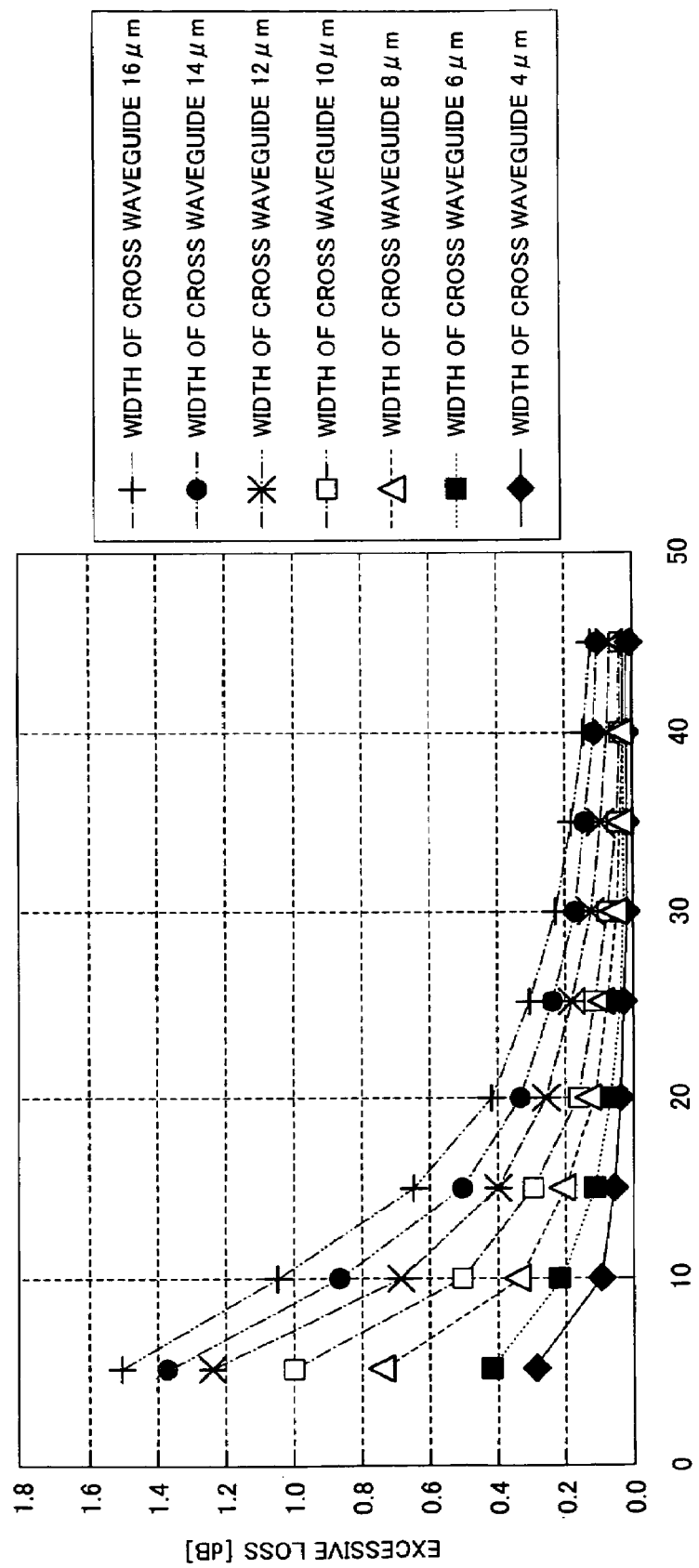
FIG. 2 is a graph for showing simulation results of loss characteristics in the optical waveguide of FIG. 1C.

Subsequently, the method for adjusting the transmission loss in an optical waveguide 30 will now be described in detail. FIG. 2 is a graph for indicating simulation results of the loss characteristics in the optical waveguide of FIG. 1C. This adjusting method will now be explained based upon FIG. 1C and FIG. 2.

In the simulation, such a general optical waveguide was used. That is, both the width and the height of the output waveguide 12-m are 6 μm, and a relative refractive index difference between the core and the clad is 0.4%. Also, a length of light is selected to be 1.55 μm. Then, while a cross angle of θ21m and a width of W21m of the cross waveguide 21-m were employed as a parameter, an excessive loss with this cross waveguide 21-m was calculated based upon the beam propagation method (BPM).

It should be noted that a lower limit value of the cross angle θ21m was selected to be 5 degrees. The reason why this lower limit value was selected to be 5 degrees is given as follows. That is, if the lower limit value is selected to be smaller than 5 degrees, then the cross waveguide 21-m is excessively approached to the output waveguide 12-m, so that there is a risk that the below-mentioned problem occurs. That is to say, the clad can be hardly embedded between the output waveguide 12-m and the cross waveguide 21-m, and since both the output waveguide 12-m and the cross waveguide 21-m may behave like a directional coupler, a wavelength dependence and a polarization dependence may occur. On the other hand, an upper limit value of the cross angle θ21m was selected to be 45 degrees. The reason of this value selection is given as follows. That is, if the upper limit value becomes equal to or larger than 45 degrees, then an excessive loss becomes substantially constant. As to the width W21m, as such a range that there is no problem in view of the manufacturing aspect and the characteristic aspect, a lower limit value thereof was selected to be 4 μm (2/3 of the width of the output waveguide), and an upper limit value thereof was selected to be 16 μm (8/3 of the width of the output waveguide).

Based upon the simulation results of FIG. 2, a range (hereinafter referred to as "dynamic range".) capable of adjusting the excessive losses by the cross angle θ21m and the width W21m is given as follows.

TABLE 1

Dynamic range by the cross angle θ21 m (width W21 m is constant)

| Width W21 m [μm] | Cross angle θ21 m [degrees] | Maximum value to minimum value of excessive loss (dynamic range) [dB] |
|---|---|---|
| 4 constant | 5-45 | 0.28-0.01 (0.27) |
| 6 constant | 5-45 | 0.42-0.02 (0.41) |
| 8 constant | 5-45 | 0.74-0.03 (0.71) |
| 10 constant | 5-45 | 1.02-0.05 (0.97) |
| 12 constant | 5-45 | 1.23-0.07 (1.16) |
| 14 constant | 5-45 | 1.37-0.10 (1.28) |
| 16 constant | 5-45 | 1.50-0.12 (1.38) |

As apparent from the table 1, while the width W21m is set to a constant width, the cross angles θ21m with respect to the respective output waveguides are adjusted from 5 degrees up to 45 degrees, so that the excessive losses can be freely adjusted. Moreover, since the width W21m is selected, any one of the adjustment tolerance and the dynamic range which constitutes a more important aspect may be selected. Concretely speaking, in the case where the large dynamic range is required, a selection is made such that the width W21m is a large value (for instance, 16 μm). As a consequence, the transmission loss difference having the large fluctuation can be compensated. Conversely, in the case where the adjustment tolerance constitutes the more important aspect, a selection is made such that the width W21m is a small value (for example, 4 μm). As a result, the tolerance with respect to the angle can be relaxed, and thus, the manufacturing fluctuation can be reduced.

Next, a case where the width W21m is employed as a parameter while the cross angle θ21m is selected to be constant is represented in a table 2.

TABLE 2

Dynamic range by the width W21 m (cross angle θ21 m is constant)

| Width W21 m [μm] | Cross angle θ21 m [degrees] | Maximum value to minimum value of excessive loss (dynamic range) [dB] |
|---|---|---|
| 4 to 16 | 5 constant | 0.28-1.50 (1.22) |
| 4 to 16 | 10 constant | 0.09-1.05 (0.96) |
| 4 to 16 | 15 constant | 0.05-0.63 (0.58) |
| 4 to 16 | 20 constant | 0.03-0.42 (0.39) |
| 4 to 16 | 25 constant | 0.02-0.30 (0.28) |
| 4 to 16 | 30 constant | 0.01-0.22 (0.21) |
| 4 to 16 | 35 constant | 0.01-0.18 (0.17) |
| 4 to 16 | 40 constant | 0.01-0.14 (0.13) |
| 4 to 16 | 45 constant | 0.01-0.10 (0.09) |

As apparent from the table 2, while the cross angle θ21m is set to be constant, the widths W21m of the cross waveguides with respect to the respective output waveguides are adjusted from 4 μm to 16 μm, so that the excessive losses can be adjusted. As explained above, not only the cross angles are adjusted, but also the widths of the cross waveguides are adjusted, so that the excessive losses can be adjusted from the minimum value of 0.01 dB (in the case of W21m=4 μm and θ21m=45 degrees) up to the maximum value of 1.50 dB (in the case of W21m=16 μm and θ21m=5 degrees).

As a consequence, both the optical waveguide device and the adjusting method of the transmission loss thereof, according to the first embodiment, have the below-mentioned effects. In the first embodiment, not only the cross angles of the cross waveguides are adjusted, but also the widths of the cross waveguides are adjusted. As a result, such an effect may be achieved that the desirable dynamic range and the desirable tolerance in the excessive loss amount can be obtained. As a consequence, in accordance with the first embodiment, such an effect may be obtained that the difference in the transmission losses occurring in the plurality of signal beams can be controlled in higher precision. For instance, in the case that the large dynamic range is required in the excessive loss amount, the width of the cross waveguide may be set to become wider than the width of the output waveguide. Conversely, in the case that the higher adjustment precision is required in the excessive loss amount, the width of the cross waveguide may be set to become equal to or narrower than the width of the output waveguide. As previously explained, the adjustments can be made in correspondence with the desirable transmission loss characteristic in the first embodiment.

Figure 3A:
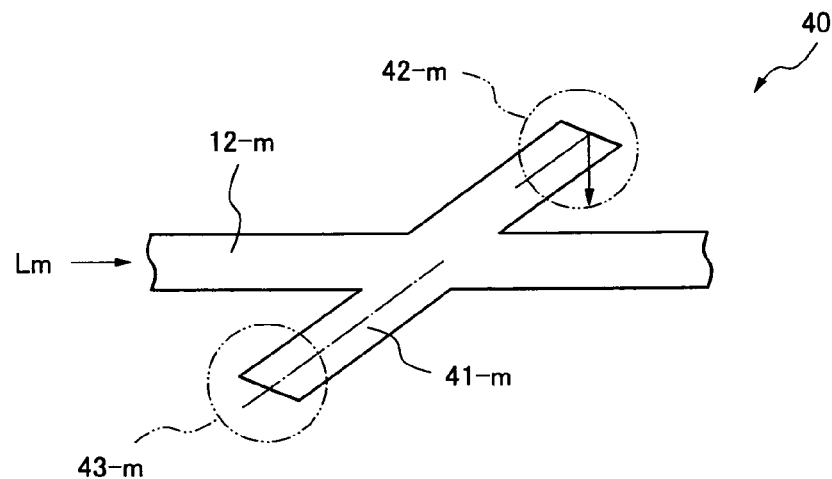
FIG. 3A is a partially enlarged view for showing an optical waveguide according to a second embodiment of the present invention.
Figure 3B:
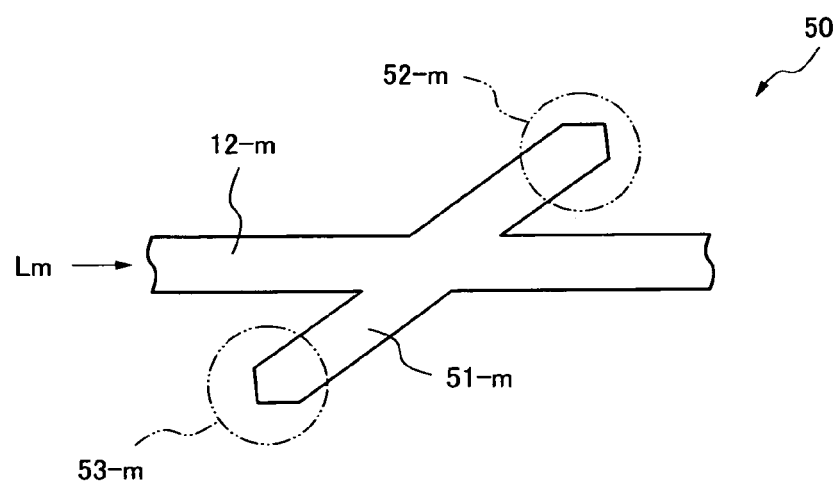
FIG. 3B is a partially enlarged view for showing an optical waveguide according to a third embodiment of the present invention.
Figure 3C:
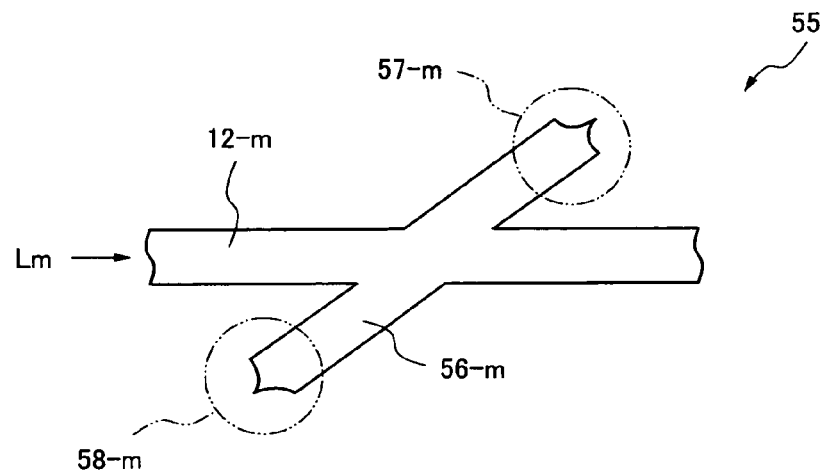
FIG. 3C is a partially enlarged view for showing an optical waveguide according to a modification of the third embodiment of the present invention.
Figure 3D:
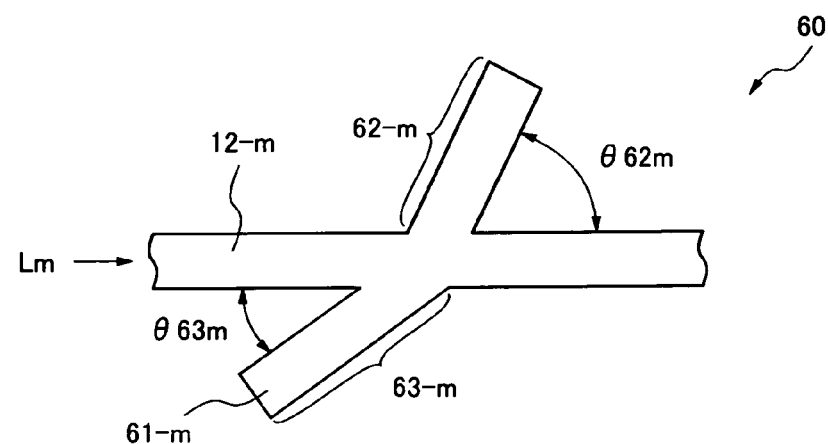
FIG. 3D is a partially enlarged view for showing an optical waveguide according to a fourth embodiment of the present invention.

Next, a description is made of prevention for returns of signal beams in optical waveguides and adjusting methods of transmission losses thereof, according to a second embodiment through a fourth embodiment of the present invention. FIG. 3A is a partially enlarged view for showing an optical waveguide 40 according to the second embodiment of the present invention. FIG. 3B is a partially enlarged view for indicating an optical waveguide 50 according to the third embodiment of the present invention. FIG. 3C is a partially enlarged view for representing an optical waveguide 55 according to a modification of the third embodiment of the present invention. FIG. 3D is a partially enlarged view for showing an optical waveguide 60 according to the fourth embodiment of the present invention. Next, the optical waveguides will now be explained based upon these drawings. It should be noted that since the same reference numerals as those shown in FIG. 1C will be employed for denoting the same structural elements shown in these drawings, explanations thereof are omitted.

The optical waveguides 40, 50, 55, and 60 according to the second embodiment through the fourth embodiment are used in the optical waveguide circuit 20 shown in FIG. 1B, instead of the optical waveguide 30 shown in FIG. 1C.

In a cross waveguide 41-m according to the second embodiment, as indicated in FIG. 3A, terminal structures 42-m and 43-m are provided on edge surfaces thereof for avoiding that signal beams are reflected to be returned. The terminal structures 42-m and 43-m have edge surfaces which are inclined with respect to such a plane perpendicular to an optical axis of the cross waveguide 41-m. As a result, a partial beam of the signal beam Lm which is inputted from the output waveguide 12-m to the cross waveguide 41-m is reflected by the edge surfaces of the terminal structures 42-m and 43-m along the oblique direction with respect to the optical axis. Therefore, this reflected beam cannot be propagated within the cross waveguide 41-m, but is radiated to the clad. As a consequence, it is possible to avoid that the signal beam is reflected on the edge surface of the cross waveguide 41-m, and then the reflected beam is transmitted through the cross waveguide 41-m along the opposite direction. Also, it is possible to avoid that the reflected beam conducts multiple beam reflections between the edge surfaces of the cross waveguide 41-m which may have an adverse effect on the signal beam.

Similar to the optical waveguide 40 of FIG. 3A, a cross waveguide 51-m according to the third embodiment, as shown in FIG. 3B, is also equipped with terminal structures 52-m and 53-m which are capable of avoiding that a signal beam is reflected on tip portions of this cross waveguide 51-m to be returned. The terminal structures 52-m and 53-m are different from the above-explained terminal structures 42-m and 43-m, namely, have the following structures. That is, both the tip portions of these terminal structures 52-m and 53-m are narrowed in taper shapes, so that a signal beam is radiated to the clad. It should be noted that a terminal structure is not limited only to, as explained above, such a structure that the tip portions of the cross waveguide are narrowed in the linear manner. For instance, the terminal structure may be alternatively formed as such a shape that the tip portions of the cross waveguide are narrowed in a curved form. As an example, a cross waveguide 56-m according to a modification of the third embodiment, as shown in FIG. 3C, is provided with terminal structures 57-m and 58-m. Different from the terminal structures 52-m and 53-m of FIG. 3B, the terminal structures 57-m and 58-m have such structures that tip portions thereof are narrowed in curved lines so as to radiate a signal beam to the clad.

In the optical waveguide 60 according to the fourth embodiment, as indicated in FIG. 3D, a cross angle is changed depending upon a direction which crosses with respect to the output waveguide 12-m. Concretely speaking, a cross waveguide 61-m is divided into a front-sided cross waveguide 62-m and a rear-sided cross waveguide 63-m, while a portion thereof which crosses with the output waveguide 12-m is set to a center. Then, a cross angle between the front-sided cross waveguide 62-m and the output waveguide 12-m is assumed as "$\theta 62m$", while the front-sided cross waveguide 62-m is extended to a direction along which the signal beam Lm is traveled. Also, across angle between the rear-sided cross waveguide 63-m and the output waveguide 12-m is assumed as "$\theta 63m$", while the rear-sided cross waveguide 63-m is extended to a direction which is opposite to the direction along which the signal beam Lm is traveled. The cross angle $\theta 62m$ of the front-sided cross waveguide 62-m is set to be larger than the cross angle $\theta 63m$ of the rear-sided cross waveguide 63-m. Generally speaking, as to intensity of light reflected from the tip portion of the cross waveguide 61-m, the light intensity of the front-sided cross waveguide 62-m extended along the travel direction of the signal beam becomes higher than the light intensity of the rear-sided cross waveguide 63-m. Also, the smaller the cross angle becomes, the higher the intensity of the reflected light becomes. As a consequence, the cross angle $\theta 62m$ of the front-sided cross waveguide 62-m is made larger than the cross angle $\theta 63m$ of the rear-sided cross waveguide 63-m, so that the light reflected from the tip portion of the cross waveguide 61-m can be reduced.

It should be noted that since these terminal structures can be realized by merely changing the pattern of the core, the manufacturing steps are not increased.

In the second embodiment to the fourth embodiment, in addition to the effects of the first embodiment, such an effect may be achieved that when the excessive losses are given to the signal beams which are propagated through the respective plurality of output waveguides, the occurrence of the return light can be prevented. As previously explained, since it is possible to avoid that the return light occurs within the cross waveguide in the second embodiment to the fourth embodiment, there is such an effect that the transmission quality can be improved. Also, these second embodiment to fourth embodiment may have such an effect that the multiple beam reflections within the cross waveguide can be avoided. As a result, these embodiment may have such an effect that the transmission quality can be improved. In addition, even when these second embodiment to fourth embodiment are carried out, there is a further effect that the manufacturing steps are not newly increased.

Next, an optical waveguide device and an adjusting method of a transmission loss thereof, according to a fifth embodiment of the present invention, will now be described in detail.

Figure 4:
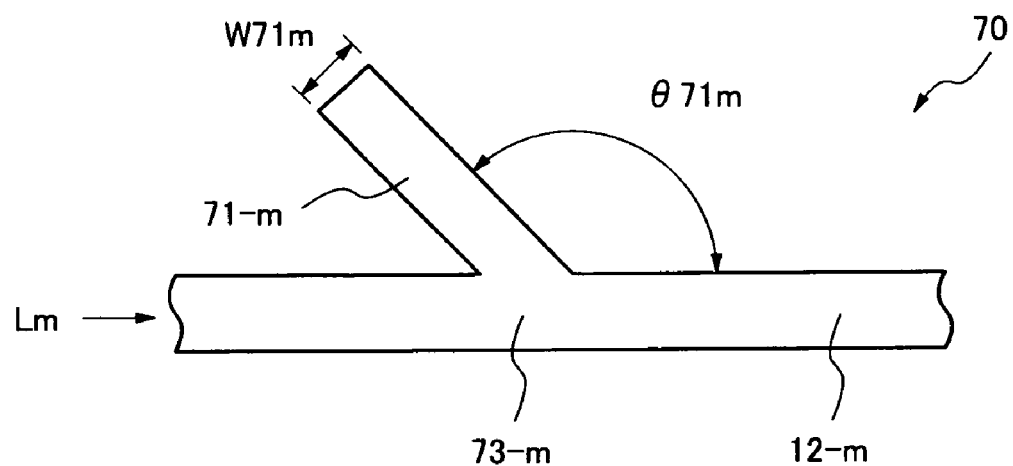
FIG. 4 is a partially enlarged view for showing an optical waveguide according to a fifth embodiment of the present invention.

FIG. 4 is a partially enlarged view for showing an optical waveguide 70 according to the fifth embodiment of the present invention. Now, the optical waveguide 70 will be explained based upon this drawing. It should be noted that since the same reference numerals as those shown in FIG. 1C will be employed for indicating the same structural elements shown in this drawing, explanations thereof are omitted.

The optical waveguide 70 according to the fifth embodiment is used instead of the optical waveguide 30 shown in FIG. 1C. The optical waveguide 70 includes an output waveguide 12-m which pass through a signal beam Lm, and a branching waveguide 71-m which is branched from the output waveguide 12-m. As indicated in FIG. 1C, in the first embodiment, the cross waveguide 21-m is extended to both sides, while the output waveguide 12-m is located at the center. In contrast thereto, in the fifth embodiment, as represented in FIG. 4, the branching waveguide 71-m is extended only to an one side of the output waveguide 12-m. As explained above, the branching waveguide 71-m extended to only one side of the output waveguide 12-m occupies a smaller space, as compared with the cross waveguide 21-m extended to both sides. As a result, the structure of the optical waveguide 70 can be made more compact, and therefore, a freedom degree of designing can be improved.

Next, a description is made of operations of the optical waveguide 70 according to the fifth embodiment. The branching waveguide 71-m according to this fifth embodiment may be operated in a similar manner to that of the cross waveguide 21-m according to the first embodiment. That is to say, the signal beam Lm propagated through the output waveguide 12-m is diffracted in a branching portion 73-m, or a partial signal beam of the signal beam Lm is coupled to the branching waveguide 71-m. As a result, an excessive loss can be applied to the signal beam Lm.

An excessive loss amount may be adjusted by a branching angle "θ71m" with respect to the output waveguide 12-m of each of the branching waveguides 71-m. If the branching angle θ71m is made acute (i.e., approximated to 0 degree), then an amount of a signal beam which is coupled from the output waveguide 12-m to the branching waveguide 71-m is increased. Therefore, the excessive loss amount is increased. Accordingly, the excessive loss amounts applied to the respective output waveguides 12-1 to 12-n can be adjusted by the cross angle θ71m. As a consequence, the optical waveguide 70 can be applied to the AWG 10 instead of the optical waveguide 30 employed in the first embodiment, so that a difference in the transmission losses among the channels can be compensated.

In this case, as represented in FIG. 4, the branching angle "θ71m" is defined as "such an angle constituted between the output waveguide 12-m of the direction along which the signal beam Lm is traveled, and the branching waveguide 71-m of the direction along which the signal beam Lm is branched." As previously explained, in the case of a cross waveguide, as to light reflected from a tip portion of this cross waveguide, light of a front-sided cross waveguide is larger than that of a rear-sided cross waveguide. Accordingly, as represented in FIG. 4, the branching angle θ71m may be preferably selected to be an obtuse angle. As a consequence, since the branching waveguide 71-m may be made of the same structure as that of the rear-sided cross waveguide, it is possible to achieve such an effect that the light reflected from the tip portion of the branching waveguide 71-m may be reduced.

Figure 5:
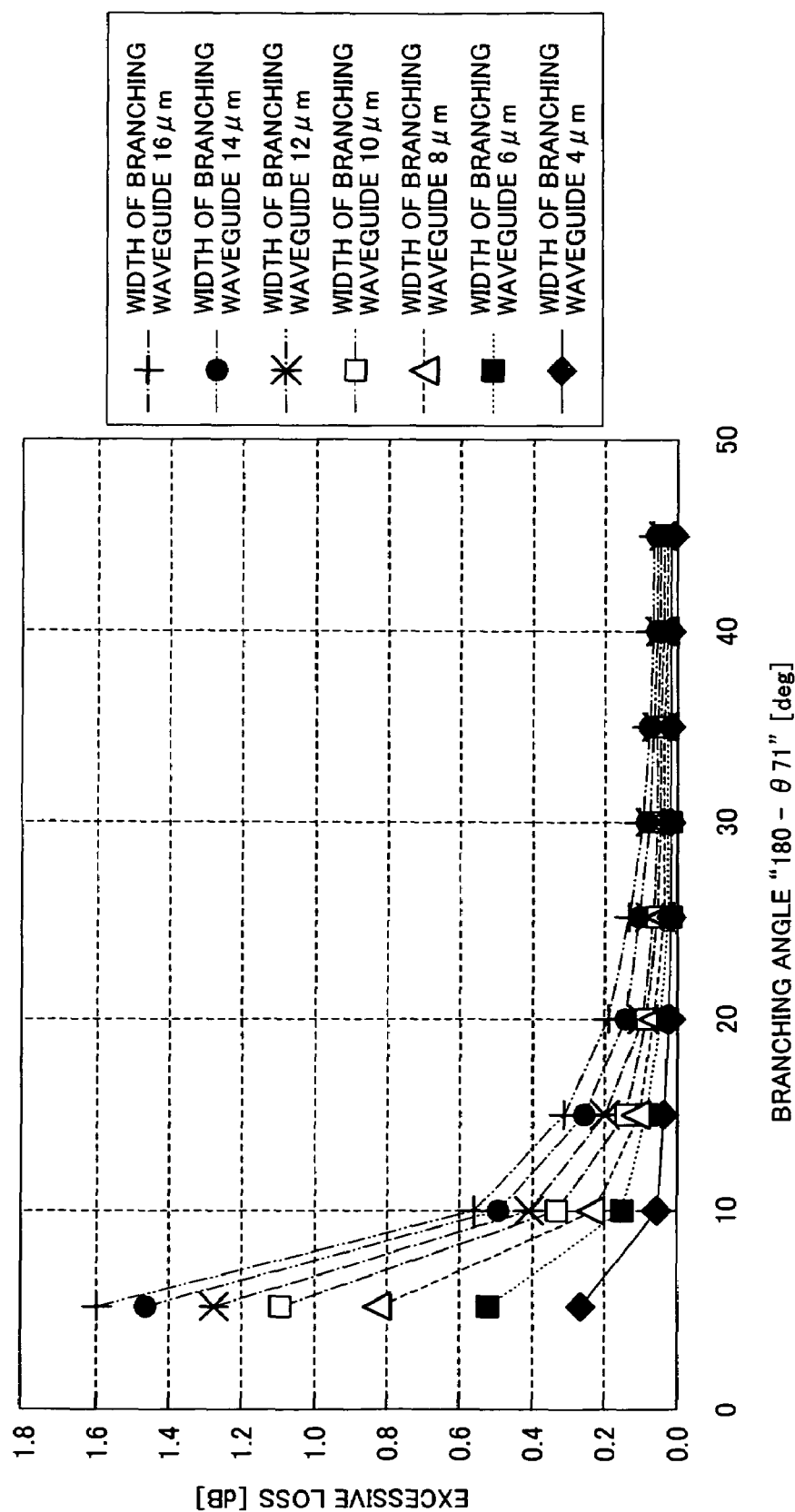
FIG. 5 is a graph for showing simulation results of loss characteristics in the optical waveguide of FIG. 4.

FIG. 5 is a graph for indicating simulation results of the loss characteristic in the optical waveguides of FIG. 4. The simulation results will now be explained based upon FIG. 4 and FIG. 5.

In the simulation, such a general-purpose optical guide was used. That is, both the width and the height of the output waveguide 12-m are 6 μm, and a relative refractive index difference between the core and the clad is 0.4%. Also, a length of light is selected to be 1.55 μm. Then, while a branching angle of θ71m and a width of W71m of the branching waveguide 71-m were employed as a parameter, an excessive loss with this branching waveguide 71-m was calculated based upon the beam propagation method (BPM). It should be noted that both a lower limit value and an upper limit value of a branching angle "180-θ71m", and both a lower limit value and an upper limit value of the width W71m were made equal to those of FIG. 2.

Based upon the simulation results of FIG. 5, a range (hereinafter referred to as "dynamic range") capable of adjusting the excessive losses by the branching angle "180-θ71m" and the width W71m is given as follows.

TABLE 3

Dynamic range by the branching angle 180-θ71 m (width W71 m is constant)

| Width W71 m [μm] | Branching angle 180-θ71 m [degrees] | Minimum value to maximum value of excessive loss (dynamic range) [dB] |
|---|---|---|
| 4 constant | 5-45 | 0.00-0.24 (0.24) |
| 6 constant | 5-45 | 0.01-0.51 (0.51) |
| 8 constant | 5-45 | 0.02-0.81 (0.79) |
| 10 constant | 5-45 | 0.03-1.07 (1.04) |
| 12 constant | 5-45 | 0.04-1.28 (1.24) |
| 14 constant | 5-45 | 0.05-1.46 (1.41) |
| 16 constant | 5-45 | 0.05-1.60 (1.55) |

As apparent from the table 3, while the width W71m is set to a constant width, the branching angles 180-θ71m with respect to the respective output waveguides are adjusted from 5 degrees up to 45 degrees, so that the excessive losses can be freely adjusted. Moreover, since the width W71m is selected, any one of the adjustment tolerance and the dynamic range which constitutes a more important aspect may be selected. Concretely speaking, in the case where the large dynamic range is required, a selection is made such that the width W71m is a large value (for instance, 16 μm). As a consequence, the transmission loss difference having the large fluctuation can be compensated. Conversely, in the case where the adjustment tolerance constitutes the more important aspect, a selection is made such that the width W71m is a small value (for example, 4 μm). As a result, the tolerance with respect to the angle can be relaxed, and thus, the manufacturing fluctuation can be reduced.

Next, a case of employing the width W71m as a parameter while the branching angle 180-θ71m is selected to be constant is represented in a table 4.

TABLE 4

Dynamic range by the width W71 m (branching angle 180-θ71 m is constant)

| Width W71 m [μm] | Branching angle 180-θ21 m [degrees] | Minimum value to maximum value of excessive loss (dynamic range) [dB] |
|---|---|---|
| 4 to 16 | 5 constant | 0.24-1.60 (1.36) |
| 4 to 16 | 10 constant | 0.06-0.58 (0.52) |
| 4 to 16 | 15 constant | 0.03-0.30 (0.27) |
| 4 to 16 | 20 constant | 0.02-0.18 (0.16) |
| 4 to 16 | 25 constant | 0.01-0.12 (0.11) |
| 4 to 16 | 30 constant | 0.01-0.09 (0.08) |
| 4 to 16 | 35 constant | 0.01-0.07 (0.06) |
| 4 to 16 | 40 constant | 0.01-0.06 (0.05) |
| 4 to 16 | 45 constant | 0.00-0.05 (0.05) |

As apparent from the table 4, while the branching angle 180-θ71m is set to be constant, the widths W71m of the branching waveguides with respect to the respective output waveguides are adjusted from 4 μm to 6 μm, so the excessive losses can be adjusted. As explained above, not only the branching angles are adjusted, but also the widths of the branching waveguides are adjusted, so that the excessive losses can be adjusted from the minimum value of 0.00 dB (in the case of W71m=4 μm and 180-θ71m=45 degrees) up to the maximum value of 1.60 dB (in the case of W71m=16 μm and 180-θ71m=5 degrees).

As a consequence, the optical waveguide device and the adjusting method of the transmission loss thereof according to the fifth embodiment, have the below-mentioned effects. Similar to the first embodiment, in the fifth embodiment, not only the branching angles of the branching waveguides are adjusted, but also the widths of the branching waveguides are adjusted. As a result, such an effect may be achieved that the desirable dynamic range and the desirable tolerance in the excessive loss amounts can be obtained. As a consequence, in the fifth embodiment, such an effect may be obtained that the difference in the transmission losses occurring in the plurality of signal beams can be controlled with higher precision. As a consequence, in the fifth embodiment, the adjustments can be made in correspondence with the desirable transmission loss characteristic. Further, in the fifth embodiment, the branching waveguide extending to only one side of the output waveguide occupies a smaller space than the cross waveguide extending to both sides. As a result, the structure of the optical waveguide can be made more compact, and therefore, a degree of freedom in terms of design can be improved. Furthermore, since the branching angle of the branching waveguide with respect to the output waveguide is adjusted to be the obtuse angle, there is another effect that the branching waveguide can reduce the adverse effect caused by the reflection, as compared with the cross waveguide.

It should be noted that even in the fifth embodiment, the terminal structures provided in the second embodiment to the fourth embodiment may be alternatively applied to the tip portion of the branching waveguide. As a result, there is another merit that the return light from the branching waveguide can be reduced.

Figure 6A:
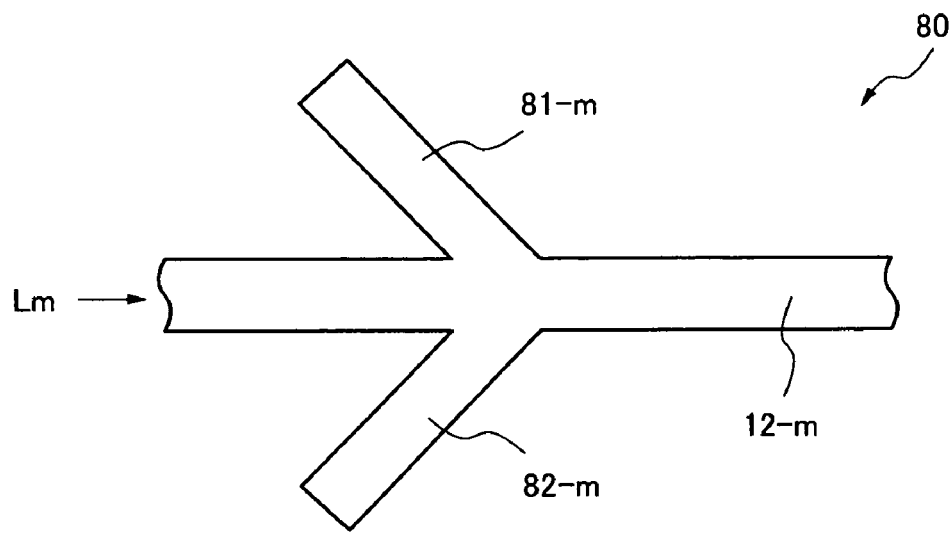
FIG. 6A is a partially enlarged view for showing an optical waveguide according to a sixth embodiment of the present invention.
Figure 6B:
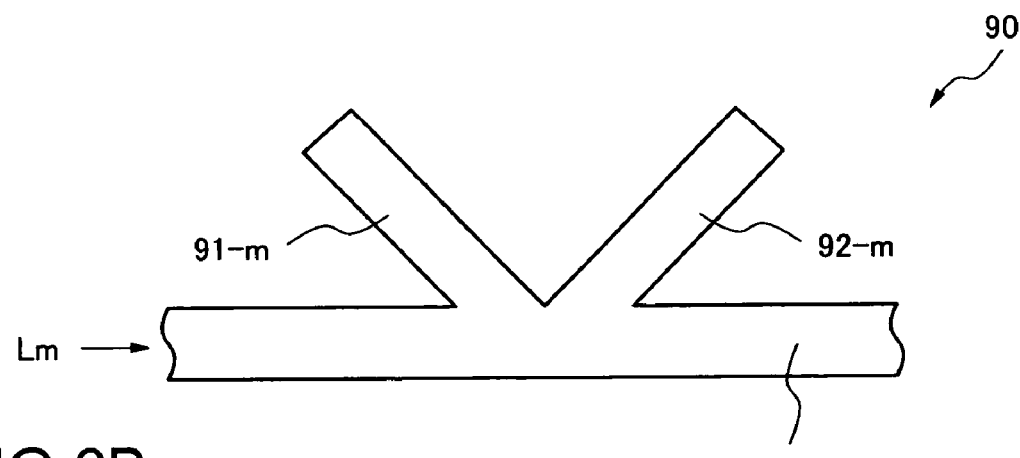
FIG. 6B is a partially enlarged view for showing an optical waveguide according to a seventh embodiment of the present invention.

FIG. 6A is a partially enlarged view for showing an optical waveguide according to a sixth embodiment of the present invention. FIG. 6B is a partially enlarged view for showing an optical waveguide according to a seventh embodiment of the present invention. Description will be made in the following with reference to the drawings. It should be noted that since the same reference numerals shown in FIG. 1C will be employed for denoting the same structural elements of those drawings, explanations thereof are omitted.

The optical waveguides 80 and 90 according to the sixth and seventh embodiments are used in the optical waveguide circuit 20 shown in FIG. 1B, instead of the optical waveguide 30 shown in FIG. 1C.

In the optical waveguide 80 shown in FIG. 6A, an output waveguide 12-m is equipped with two branching waveguides 81-m and 82-m. As a result, excessive losses are increased. Since both the branching waveguides 81-m and 82-m correspond to the above-described rear-sided cross waveguide, an amount of light reflected from tip portions thereof is small. As a result, a high effect of preventing return light is achieved.

In the optical waveguide 90 shown in FIG. 6B, an output waveguide 12-m is equipped with two branching waveguides 91-m and 92-m. As a result, excessive losses are increased. Also, in the seventh embodiment, the branching waveguides 91-m and 92-m extending to only one side are employed, while the output waveguide 12-m is located at a center. As a result, similar to the fifth embodiment, a degree of freedom in terms of design can be improved.

Figure 7A:
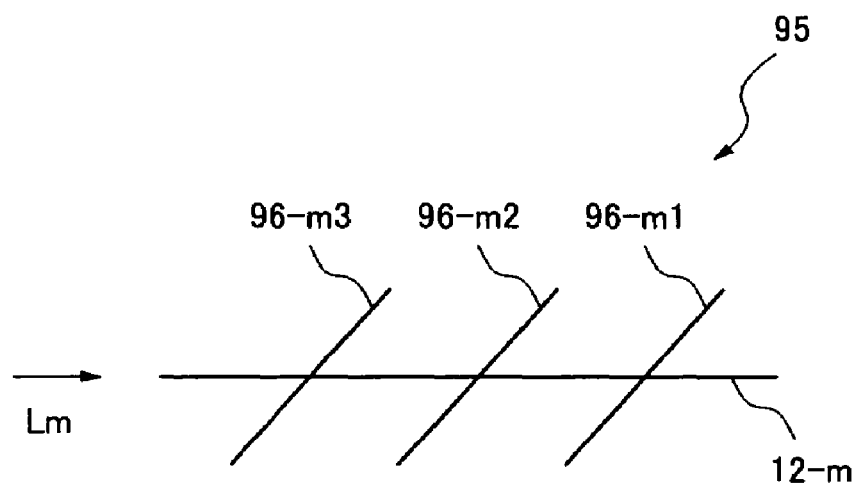
FIG. 7A is a partially enlarged view for showing an optical waveguide according to an eighth embodiment of the present invention.
Figure 7B:
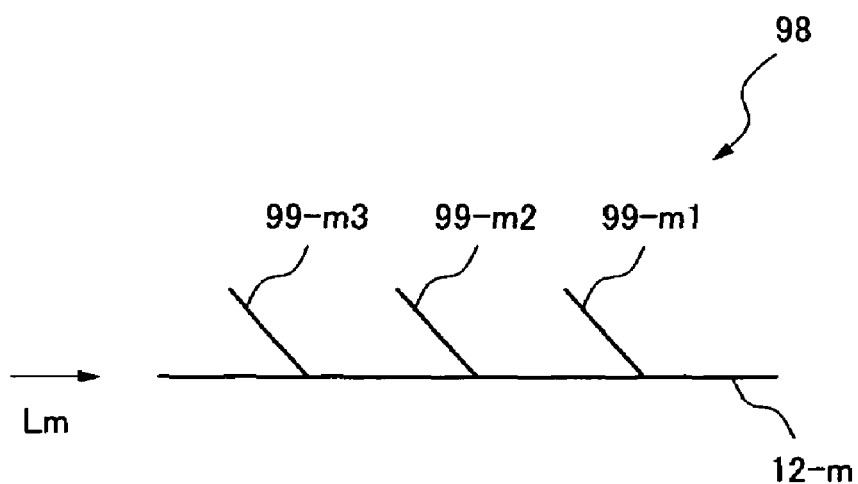
FIG. 7B is a partially enlarged view for showing an optical waveguide according to a ninth embodiment of the present invention.
Figure 8:
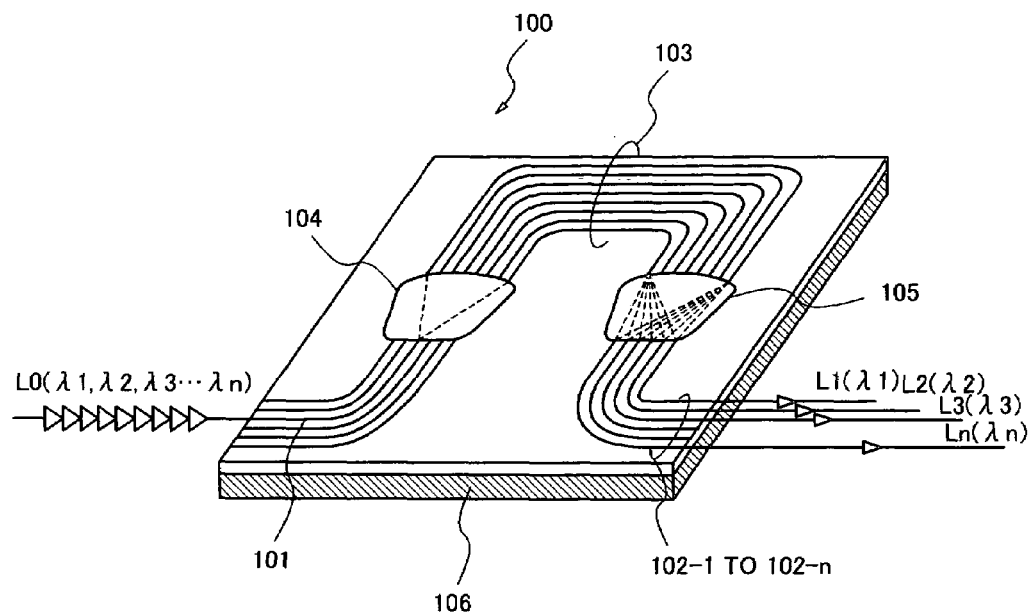
FIG. 8 is a plan view for showing a basic structure of a general-purpose AWG.
Figure 9:
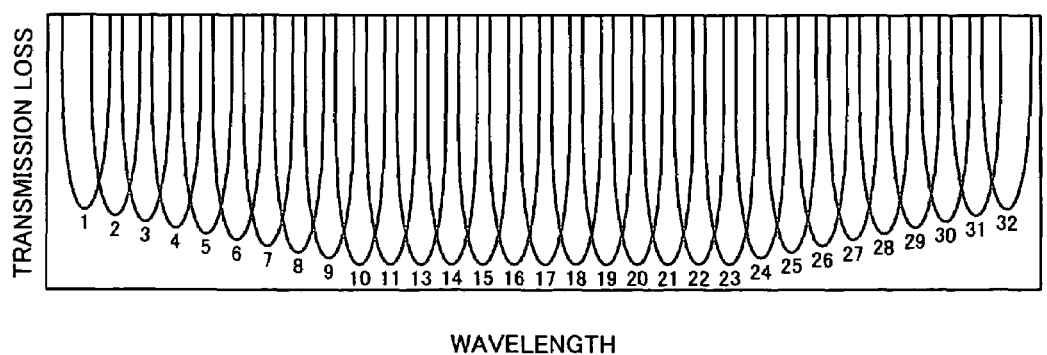
FIG. 9 is a graph for showing transmission losses for every port that the general-purpose AWG has.
Figure 10:
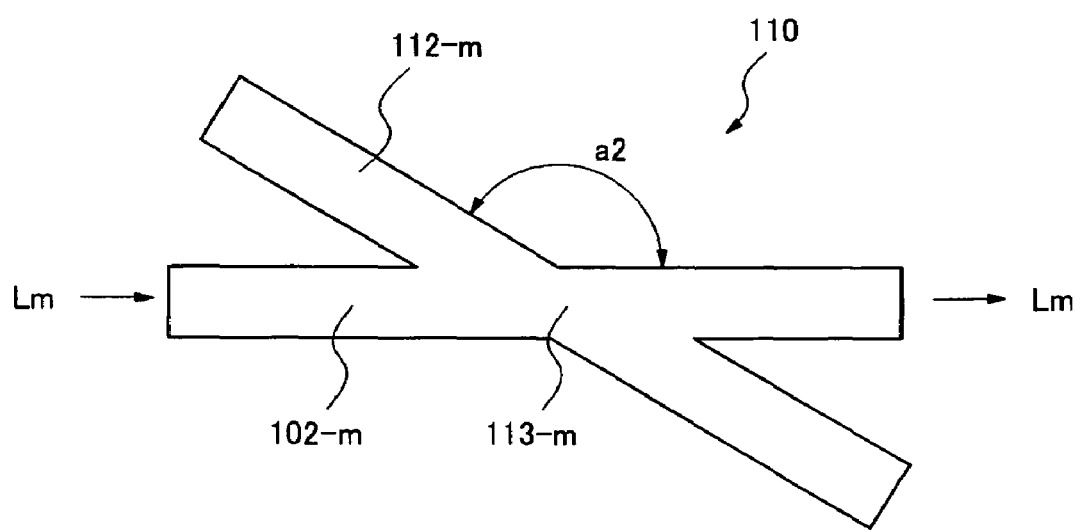
FIG. 10 is a plan view for showing an optical waveguide structure which is applied to an optical waveguide device related to the present invention.

FIG. 7A is a partially enlarged view for showing an optical waveguide according to an eighth embodiment of the present invention. FIG. 7B is a partially enlarged view for showing an optical waveguide according to a ninth embodiment of the present invention. Description will be made in the following with reference to the drawings. It should be noted that since the same reference numerals shown in FIG. 1C will be employed for denoting the same structural elements of those drawings, explanations thereof are omitted.

The optical waveguides 95 and 98 according to the seventh and eighth embodiments are used in the optical waveguide circuit 20 shown in FIG. 1B, instead of the optical wavelength 30 shown in FIG. 1C.

In the optical waveguide 95 shown in FIG. 7A, a plurality of cross waveguides 96-m1, 96-m2, . . . are provided in a cascade form with respect to the output waveguide 12-m. As explained above, a plurality of cross waveguides may be provided with respect to one output waveguide. As the number of cross waveguides is increased, the excessive loss becomes larger. As a result, the excessive loss amount can be adjusted.

In a similar manner, in the optical waveguide 98 shown in FIG. 7B, a plurality of branching waveguides 99-m1, 99-m2, . . . are provided in a cascade form with respect to the output waveguide 12-m. As explained above, a plurality of branching waveguides may be provided with respect to one output waveguide. As the number of branching waveguides is increased, the excessive loss becomes larger. As a result, the excessive loss amount can be adjusted.

While the embodiments according to the present invention have been described, the shapes and the arrangements of the respective structural components are not limited only to the above-explained arrangements shown in the drawings, and may be properly modified without departing from the featured range of the present invention. Alternatively, a plurality of the above-explained embodiments may be used in combination. For instance, the terminal structures of the second embodiment through the fourth embodiment may be alternatively provided on the edge surfaces of the branching waveguides according to the fifth embodiment through the seventh embodiment. As explained above, arbitrary embodiments may be alternatively combined with each other.

It should be noted that the excessive loss amounts may be realized based upon anyone of widths of either cross waveguides or branching waveguides, any one of angles of either cross waveguides or branching waveguides, or any one of total numbers of either cross waveguides or branching waveguides. The narrower the width becomes, the smaller the excessive loss becomes, whereas the wider the width becomes, the larger the excessive loss becomes. The smaller the angle becomes, the larger the excessive loss becomes, whereas the larger the angle becomes, the smaller the excessive loss becomes. The larger the total quantity becomes, the larger the excessive loss becomes. The smaller the total quantity becomes, the smaller the excessive loss becomes. Since these items are employed in combination, the excessive loss amount may be further largely changed.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. An optical waveguide device, comprising:
   a plurality of optical waveguides propagating therethrough a signal beam; and
   a plurality of optical sub-waveguides connected to the plurality of optical waveguides at a connection angle respectively, applying an excessive loss to the signal beam by branching a partial beam of the signal beam, wherein
   each of the plurality of optical sub-waveguides has a width and the connection angle determined based upon an amount of the excessive loss to be applied to the signal beam, and
   the connection angle of the optical sub-waveguides includes an angle of 5 degrees or more and 45 degrees or less.

2. An optical waveguide device according to claim 1, further comprising a terminal structure avoiding that the partial beam of the signal beam branched by the plurality of optical sub-waveguides respectively is reflected, and the reflected partial beams are returned to the plurality of optical waveguides respectively.

3. An optical waveguide device according to claim 2, wherein the terminal structure has an oblique edge surface with respect to a plane perpendicular to an optical axis of the optical sub-waveguides.

4. An optical waveguide device according to claim 3, wherein the terminal structure has a single-tapered shape.

5. An optical waveguide device according to claim 3, wherein the oblique edge surface is inclined at an angle equal to or larger than several degrees with respect to the plane perpendicular to the optical axis of the optical sub-waveguides.

6. An optical waveguide device according to claim 2, wherein the terminal structure has a double-tapered shape.

7. An optical waveguide device according to claim 6, wherein the double-tapered shape is linearly narrowed.

8. An optical waveguide device according to claim 6, wherein the double-tapered shape is curvely narrowed.

9. An optical waveguide device according to claim 1, wherein connection angles of right and left sides of the optical sub-waveguide are different from each other with respect to the optical waveguide.

10. An optical waveguide device according to claim 9, wherein the connection angle formed on the side where the signal beam travels is more obtuse than the connection angle formed on a side opposite to the side where the signal beam travels.

11. An optical waveguide device according to claim 1, wherein the width of the optical sub-waveguide includes a width of 4 μm or more and 16 μm or less.

12. An optical waveguide device according to claim 1, wherein the optical sub-waveguides intersect with the optical waveguides.

13. An optical waveguide device according to claim 1, wherein the optical sub-waveguides branch off from the optical waveguides.

14. An optical waveguide device according to claim 1, wherein a plurality of the optical sub-waveguides are provided with respect to each of the optical waveguides.

15. An optical waveguide device according to claim 14, wherein the plurality of optical sub-waveguides are connected at substantially the same position of the optical waveguide, and are arranged on both sides of the optical waveguides.

16. An optical waveguide device according to claim 14, wherein the plurality of optical sub-waveguides are connected at substantially the same position of the optical waveguide, and are arranged on one side of the optical waveguides.

17. An optical waveguide device according to claim 14, wherein the plurality of optical sub-waveguides are connected at different position of the optical waveguide.

18. An optical waveguide device according to claim 1, further comprising a slab waveguide, wherein:
   the plurality of optical waveguides are connected to the slab waveguide, and the plurality of optical sub-waveguides are connected to the plurality of optical waveguides, respectively; and
   the amount of the excessive losses applied to the signal beams propagated through the plurality of optical waveguides is adjusted.

19. An optical waveguide device according to claim 18, wherein the optical waveguide device comprises one selected from the group consisting of an arrayed waveguide grating, an optical splitter, and an optical star coupler.

20. An optical waveguide device, comprising:
   a plurality of optical waveguides propagating therethrough a signal beam; and
   a plurality of optical sub-waveguides connected to the plurality of optical waveguides at a connection angle respectively, applying an excessive loss to the signal beam by branching a partial beam of the signal beam, wherein
   each of the plurality of optical sub-waveguides has a width and the connection angle determined based upon an amount of the excessive loss to be applied to the signal beam, and
   the width of the optical sub-waveguide includes a width equal to or larger than ⅔ width of the optical waveguide and equal to or smaller than ⅜ width of the optical waveguide.

21. An optical waveguide device according to claim 20, further comprising a terminal structure avoiding that the partial beam of the signal beam branched by the plurality of optical sub-waveguides respectively is reflected, and the reflected partial beams are returned to the plurality of optical waveguides respectively.

22. An optical waveguide device according to claim 21, wherein the terminal structure has an oblique edge surface with respect to a plane perpendicular to an optical axis of the optical sub-waveguides.

23. An optical waveguide device according to claim 22, wherein the terminal structure has a single-tapered shape.

24. An optical waveguide device according to claim 22, wherein the oblique edge surface is inclined at an angle equal to or larger than several degrees with respect to the plane perpendicular to the optical axis of the optical sub-waveguides.

25. An optical waveguide device according to claim 22, wherein the terminal structure has a double-tapered shape.

26. An optical waveguide device according to claim 25, wherein the double-tapered shape is linearly narrowed.

27. An optical waveguide device according to claim 25, wherein the double-tapered shape is curvely narrowed.

28. An optical waveguide device according to claim 20, wherein connection angles of right and left sides of the optical sub-waveguide are different from each other with respect to the optical waveguide.

29. An optical waveguide device according to claim 28, wherein the connection angle formed on the side where the signal beam travels is more obtuse than the connection angle formed on a side opposite to the side where the signal beam travels.

30. An optical waveguide device according to claim 20, wherein the width of the optical sub-waveguide includes a width of 4 μm or more and 16 μm or less.

31. An optical waveguide device according to claim 20, wherein the optical sub-waveguides intersect with the optical waveguides.

32. An optical waveguide device according to claim 20, wherein the optical sub-waveguides branch off from the optical waveguides.

33. An optical waveguide device according to claim 20, wherein a plurality of the optical sub-waveguides are provided with respect to each of the optical waveguides.

34. An optical waveguide device according to claim 33, wherein the plurality of optical sub-waveguides are connected at substantially the same position of the optical waveguide, and are arranged on both sides of the optical waveguides.

35. An optical waveguide device according to claim 33, wherein the plurality of optical sub-waveguides are connected at substantially the same position of the optical waveguide, and are arranged on one side of the optical waveguides.

36. An optical waveguide device according to claim 33, wherein the plurality of optical sub-waveguides are connected at different position of the optical waveguide.

* * * * *

UNITED STATES PATENT AND TRADEMARK OFFICE
CERTIFICATE OF CORRECTION

PATENT NO.         : 7,356,212 B2
APPLICATION NO.    : 11/581327
DATED              : April 8, 2008
INVENTOR(S)        : Shinya Watanabe It is certified that error appears in the above-identified patent and that said Letters Patent is hereby corrected as shown below:

Col. 7, line 53, delete "(1.28)" and insert --(1.27)--.

Col. 12, line 12, delete "(0.51)" and insert --(0.50)--.

Signed and Sealed this
Twenty-eighth Day of June, 2011

David J. Kappos
*Director of the United States Patent and Trademark Office*